Jan. 13, 1970    H. N. BRAUM ET AL    3,488,886
MACHINE FOR PRODUCING SPIRALLY- OR STRAIGHT-FLUTED WORKPIECES BY GRINDING

Filed Aug. 1, 1967    2 Sheets-Sheet 1

INVENTORS
H. NORMAN BRAUM
PETER KÖGLER
BY *Ernest G. Montague*
ATTORNEY

Jan. 13, 1970   H. N. BRAUM ET AL   3,488,886
MACHINE FOR PRODUCING SPIRALLY- OR STRAIGHT-FLUTED
WORKPIECES BY GRINDING
Filed Aug. 1, 1967   2 Sheets-Sheet 2

A GROOVE GRIND   C PARTIAL GRIND
B BACK GRIND     D LOAD

INVENTORS
H. NORMAN BRAUM
PETER KÖGLER
BY
ATTORNEY.

United States Patent Office 3,488,886
Patented Jan. 13, 1970

3,488,886
MACHINE FOR PRODUCING SPIRALLY-
OR STRAIGHT-FLUTED WORKPIECES
BY GRINDING
Hans Norman Braum, Helenenstrasse 21, and Peter
Kogler, von Krehlstrasse 4, both of Wiesbaden,
Germany
Filed Aug. 1, 1967, Ser. No. 657,618
Claims priority, application Germany, Aug. 3, 1966,
B 88,310
Int. Cl. B24b 19/04, 5/04, 41/04
U.S. Cl. 51—3                                    8 Claims

ABSTRACT OF THE DISCLOSURE

Machine of producing spiral- and straight-fluted workpieces, particularly of twist drills by grinding, which comprises a revolving head swingable about its center axis and a reciprocating workpiece slide retaining the revolving head. A plurality of work spindles equal in number with that of the working steps required for the production of the workpiece are provided and means for feeding all the work spindles simultaneously to the respective working positions, so that after a complete working cycle the workpiece can be removed in its finished state.

---

The present invention relates to a machine for production of spirally- or straight-fluted workpieces, particularly of twist drills, by grinding.

In the production of high-quality twist drills, it is known to obtain the shaping by grinding, in addition to the widely used milling and rolling process. The spiral flutes, the reliefs and the point grinding are ground in hardened blanks. These three working operations are performed now by separate special machines (flute grind-, relief grind- and point grind-machines) in individual working steps. Lately machines are also known, which grind the flutes and the reliefs simultaneously.

It is one object of the present invention to provide a machine for production of spirally- or straight-fluted workpieces by grinding, which machine performs the above-stated three working steps, which have been performed separately spatially and temporally, now simultaneously, that means which produces a twist drill by flute grinding, relief grinding and point grinding in one working cycle.

It is another object of the present invention to provide a machine for producing of spirally- or straight-fluted workpieces by grinding, which comprises a revolving head swingable about its center axis and including as many work spindles, as they correspond with the number of the working steps required for the production of the workpiece, and wherein all work spindles are simultaneously fed to the respective working positions by an advancing movement, so that after passing through a complete cycle, a workpiece can be removed in its finished state. During each cycle of the machine thus the blanks are simultanously worked by all work spindles, thus by flute grinding, relief grinding and point grinding, so that after each run of the machine, upon termination of the complete working cycle, the twist drill, or another workpiece, is completely worked.

It is yet another object of the present invention to provide a machine for production of spirally- or straight-fluted workpieces by grinding, wherein the work spindles are disposed adjacent each other in a head. The work spindles are disposed adjacent each other in a head. The work spindles are positioned by a circulating link conveyor and then fed simultaneously to the respective working positions.

It is a further object of the present invention to provide a machine for production of spirally- or straight-fluted workpieces by grinding, wherein the work spindles are disposed in a revolving head such, that two work spindles lie adjacent each other in a plane, so that it is possible to divide a great chip cross-section (by example chip flutes) into two cuts by means of two grinding wheels disposed on a grinding spindle and having different diameters adjusted relative to each other.

In the manufacture of twist drills the point grinding offers particular difficulties, since certain requirements to the geometric shape are set.

There are conventionally a spiral point grind, an envelope of cone grind and a face grind (one- or two face point grind). The machine designed in accordance with the present invention offers the possibility to produce all these point grinding means.

The difference between the forward stroke of the workpiece and the lifting of the point grinding disc required for the production of a spiral point grind is brought about such, that the slide of the point grind disc is pushed back by the workpiece slide by means of rods, whereby upon displacement of the connecting bolt in longitudinal slots of two two-armed levers an infinitely variable adjustment of the lifting of the grinding disc and, thereby, and infinitely variable setting of the relief-grinding angle on the drill is made possible.

The point grind on an envelope of a cone is produced in such manner, that three different ascents are provided on the advancing cam disc. The first ascent guides the blank in rapid motion to the grinding disc and the second ascent causes the working advance stroke for the production of the spiral. After the working of the flute- and relief-grind, these grinding discs are brought out of engagement by adjustable cams. The workpiece makes them by the third ascent, provided in accordance with the present invention, still a very small advancing movement. Jointly with the rotary movement of the workpiece a point grind on the envelope of a cone is produced thereby. It is an assumption therefore, that the cutting edge of the spiral groove is disposed perpendicular to the point grind disc during the point grind, that means at the start of the advancing stroke by the third ascent.

It is also another object of the present invention to provide a machine for production of spirally- or straight-fluted workpieces by grinding, wherein the spindle head carrying the point grind wheel is swingable in the plane of the face of a cone envelope about the grinding point by a vertical and horizontal adjustment possibility, or by a ball joint or other suitable means. Properly the point grind wheel is designed as a cup wheel. The grinding face of this cup wheel must be brought into a position, which corresponds with the desired angles (nose angle, back grind angle) on the drill.

It is yet a further object of the present invention to provide a machine for production of spirally- or straight-fluted workpieces by grinding, wherein the point grind of a cone envelope is produced such, that the advancing stroke of the rotary movement of the workpiece is interrupted in a predetermined position after accomplished flute- and relief-grind and the spindle head carrying the point grind wheel is fed to the workpiece by a cam corresponding with the cone envelope and thus brings about the point grind.

The face point grind is produced in such manner, that the work piece engages the point grind wheel designed with the desired cutting angles during the advanced stroke for the working of the spiral at the moment, when the edge of the drill is disposed vertically. After the point grinding is completed the grinding wheel is lifted from the drill.

It is still a further object of the present invention, to provide a machine for production of spirally- or straight-fluted workpieces by grinding, wherein a face grind is produced such, that the advancing stroke and the rotary movement of the workpiece are interrupted after completed flute- and relief grind in a predetermined position, and the point grind wheel, which is designed with the corresponding point grind angles and relief grind angles, is fed to the workpiece along a straight line. After the completed grind the grinding wheel is lifted from the drill and now also a two-face grind can be obtained by swinging the grind spindle head into another angular position and repeated feeding to the drill.

It is still a further object of the present invention to provide a machine for production of spirally-or straight-fluted workpieces by grinding, wherein, in addition to the spiral pitch obtained by a cam disc and a gear transmission, a supplementary, right-or left-pitch spiral effective in the direction of the advancing stroke is intercalated, so that not only a correction of the produced spiral can be obtained, rather by suitable choice of the supplemental spiral pitch, the rotary movement of the work spindles is completely canceled out, so that a straight advancing movement results, and simultaneously an automatic division of the workpiece takes place during the return stroke of the machine.

It is, however, also an additional object of the present invention to provide a machine for producing of spirally-or straight-fluted workpieces by grinding, wherein a releasable coupling is provided on the work spindles mounted in the head, so that it is possible to operate one of the work spindles with a rotary movement within the head, yet another of the work spindles without a rotary movement, which expedient is of particular importance for the production of threading machines.

With these and other objects in view which will become apparent in the following detailed description, the present invention will be clearly understood, in connection with the accompanying drawings, in which.

Figure 1:
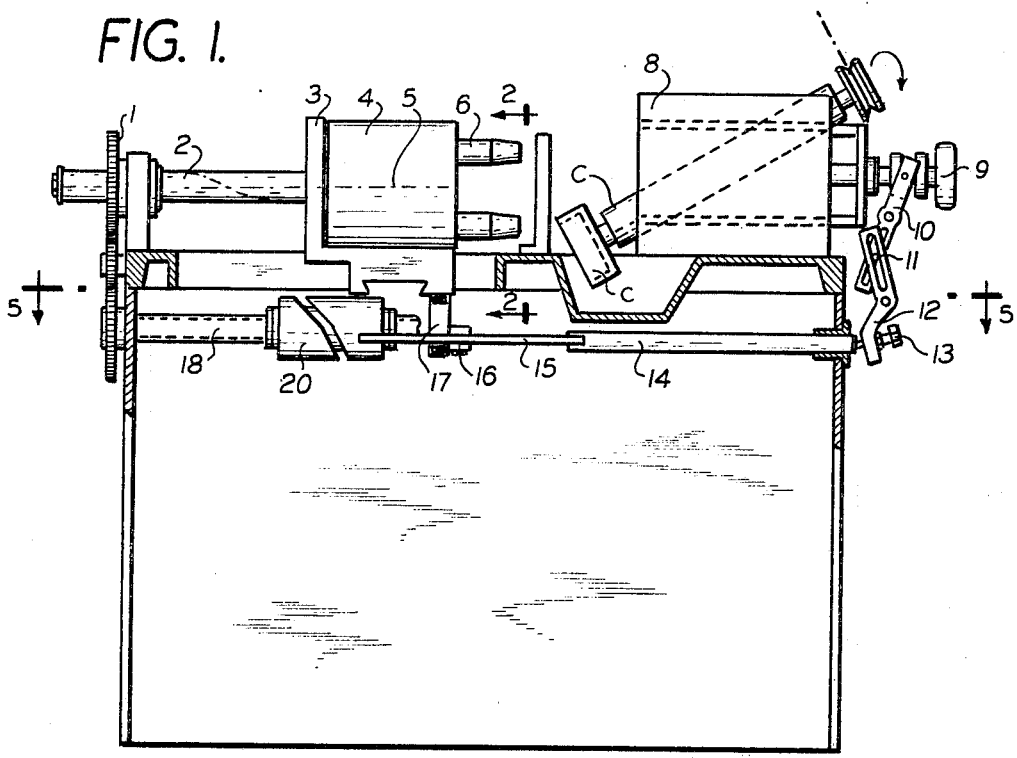
FIG. 1 is a side elevation, partly in section, of a machine, designed in accordance with the present invention.
Figure 4:
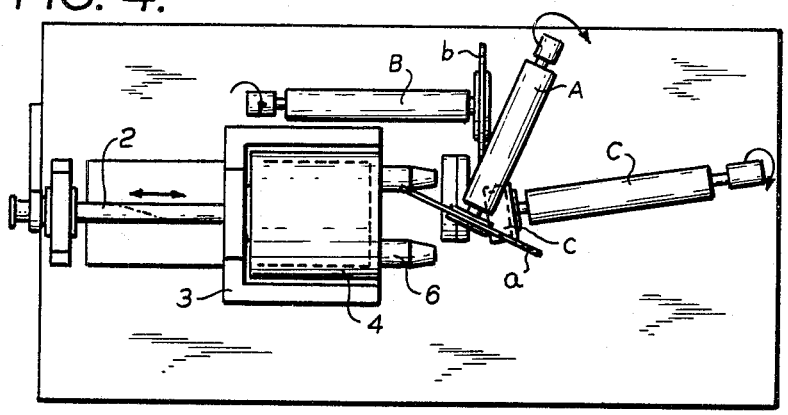
FIG. 4 is a top plan view of the machine.
Figure 5:
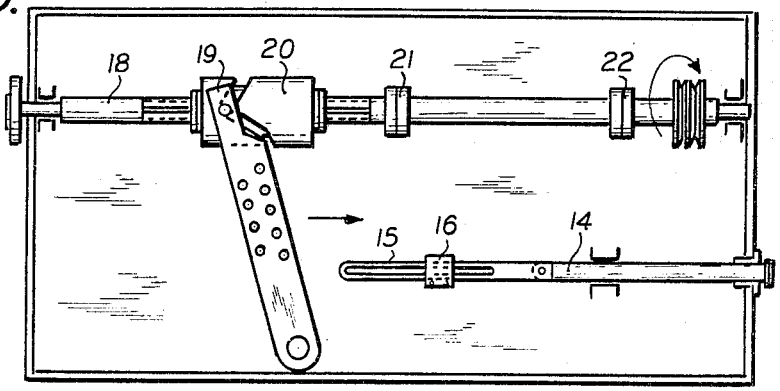
FIG. 5 is a section along the lines 5—5 of FIG. 1.

Referring now to the drawings, and in particular to FIG. 1, the machine comprises a revolving head 4 swingable about its center axis 5, in which head 4 many work spindles 6 are mounted, as working operations have to be performed. The revolving head 4 is retained in a reciprocating work piece slide 3. By swinging of the revolving head 4, the work spindles 6 are brought into starting position for the following working. The blanks are fed to the working groups A, B and C disposed within the swinging radius of the revolving head 4 by the workpiece 3 advanceable by an advancing cam disc 20 with an adjustable lever system 19 (FIG. 5).

This total working cycle including the feeding and setting of the grinding wheels a, b and c can take place fully automatically in accordance with a set program.

For the production of the previously mentioned spiral point grind, the grinding wheel c secured to an adjustable slide 8 is set such, that the advancing drill engages the grinding wheel c at the moment, when the edge of the drill stands vertically.

A lever 15 is adjusted by means of a settable abutment 16 such, that it is joined to the movement of the work piece slide 3 by means of a bolt 17 at the moment, in which the vertically disposed edge of the drill engages the grinding wheel c. The advance stroke of this lever 15 corresponds thus with the advance stroke of the work piece. This advance stroke moment of the lever 15 is transmitted by means of the rod 14 and the levers 10 and 12 over the adjustment spindle 9 to the slide 8 of the grinding wheel c. A fine correction is made possible by the set screw 13.

With a transmission ratio of 1:1 of the levers 10 and 12, the lifting of the grinding wheel c would be equal to the advance stroke movement of the workpiece slide 3. By displacement of the connecting bolt 11 in the longitudinal slots of the levers 10 and 12, an infinitely variable change of the transmission ratio can be performed.

If the transmission ratio is chosen such, that the lifting of the grinding wheel c is smaller than the advance stroke of the workpiece slide 3, due to the difference of the strokes on the edge of the drill, a relief grind is brought about, which jointly with the rotation of the drill results in a spiral-point grind. By variation of the transmission ratio thus the relief grind angle can be varied.

FIG. 5 discloses the drive shaft 18 with the advance stroke cam disc 20. Adjustable lifting cams 21 and 22 for the working groups of the relief grind B and of the flute grind A are provided.

Figure 6:
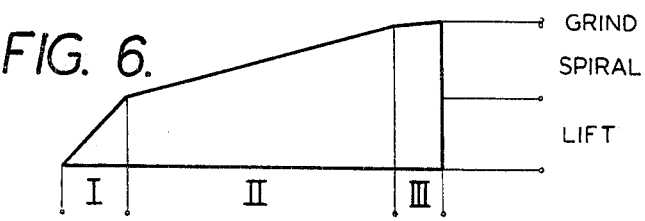
FIG. 6 is a diagram depicting the advance cam disc for the production of the spiral and the cone envelope grind.

The forming of the cone envelope grind on twist drills is apparent from FIG. 6 and the detailed description dealing with the production of the cone envelope grind.

Figure 7:
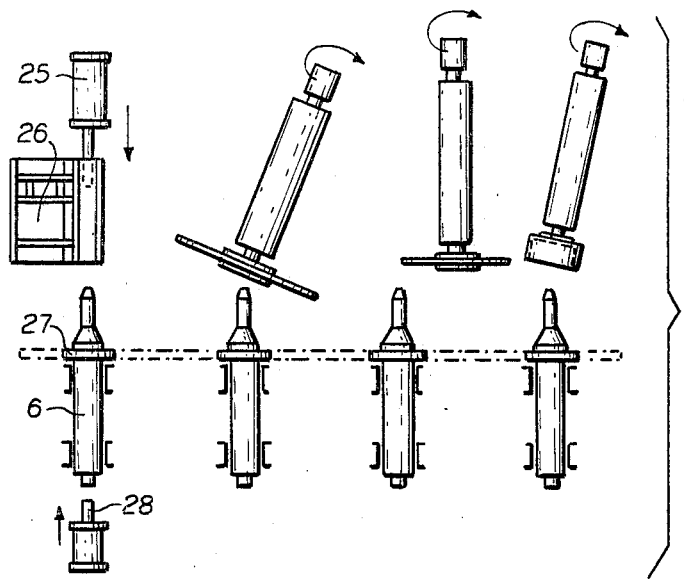
FIG. 7 is a schematic top plan view of another embodiment of the arrangement of the work spindles.
Figure 8:
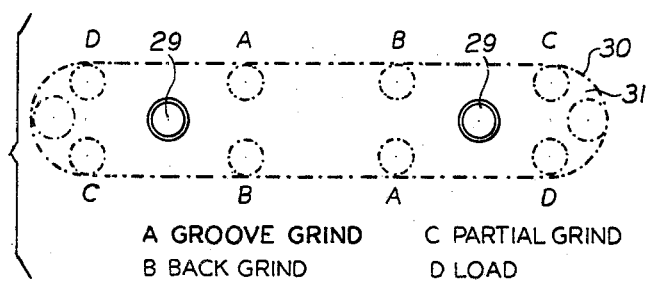
FIG. 8 is a schematic side elevation of the machine shown in FIG. 7.

FIG. 7 discloses another embodiment of the machine in which the work spindles 6 are disposed adjacent each other. By means of a circulating link conveyor 30 with the assistance of toothed transmission elements 27 are the work spindles 6 positioned and then indexed. The loading of the work spindles takes place in such manner, that an air cylinder 28 or corresponding other hydraulic, electric or mechanical elements opens the collet chuck for the blank. The blank is moved from a magazine 26 by an air pressure cylinder 25 or other suitable elements into the work spindle. A receiving head 31 is equipped with a guide 29.

In the same manner as for the twist drill production, the machine is also suitable for the manufacture or production of screw taps. The production of spirally fluted screw taps takes place similarly to that of twist drills. In addition to screw taps with spirally shaped flutes, others are known with straight flutes. Both embodiments can be produced on the machine designed in accordance with the present invention.

The production of the straight-fluted screw taps can take place in such manner that, between the gear transmission 1, producing the rotary movement, and the center axis 5 of the revolving head 4, a spiral fluted, additional spindle 2 is intercalated, which during the advancing stroke of the workpiece slide 3 makes possible a balancing of the rotary movement of the work spindle 6. By this arrangement, during the return stroke of the machine simultaneously an automatic division of the workpiece is obtained, which is dependent upon the ratio of the provided toothed gears (for instance 1:3 or 1:4, depending upon the number of flutes in the workpiece).

Another possibility for the production of a straight flute resides in an arrangement, according to which in the revolving head 4 a releasable coupling is intercalated between the work spindles and the gear transmitting the rotary movement, which coupling makes it possible, to cancel out selectively the rotary movement for each work spindle separately, so that upon terminated advance stroke and return stroke, the spindle returns without rotary movement again into the starting position. By this arrangement, it is brought about that, for instance, during the production of screw taps on the one work spindle, the straight flute is produced without rotary movement of the spindle, and on another work spindle the edge grind takes place by means of a rotary movement of the spindle.

Figure 2:
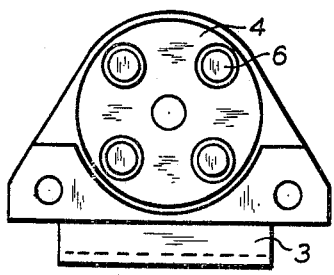
FIG. 2 is a section along the lines 2—2 of FIG. 1; two spindles of each pair being shown on the same level.
Figure 3:
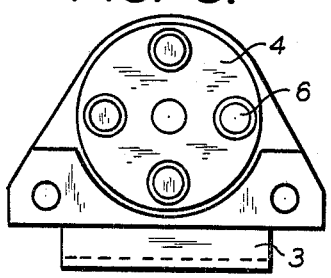
FIG. 3 is a section similar to that of FIG. 2 but indicating the normal arrangement of the work spindles.

As can be as certained from the different showings in accordance with FIGS. 2 and 3, the work spindles can be arranged in the revolving head 4 such, that two work spindles are disposed adjacent each other in one plane, so that it is made possible to divide a large chip cross-section into two cuts on two grinding wheels with correspondingly stepped-up diameters, which are mounted on a joint grinding spindle.

While we have disclosed several embodiments of the present invention, it is to be understood that these embodiments are given by example only and not in a limiting sense, the scope of the present invention being determined by the objects and the claims.

We claim:

1. A machine for producing of spiral- and straight-fluted workpieces, particularly of twist drills by grinding, comprising
a revolving head swingable about its center axis,
a reciprocating workpiece slide retaining said revolving head,
a plurality of work spindles equal in number with that of working steps required for the production of the workpiece,
means for feeding all said work spindles simultaneously to the respective working positions, so that after a complete working cycle the workpiece can be removed in its finished state,
an additional slide supporting one grinding wheel,
a rod means operatively connected with said additional slide and displacing the latter by means of said workpiece slide,
two two-armed levers having longitudinal slots,
a connecting bolt extending through said slot and securing together said two-armed levers, and
said connecting bolt being adapted to be displaced in said slots in order to obtain an infinitely variable setting of the lifting of said grinding wheel and thereby an infinitely variable setting of the relief grind angle, thus providing the required difference between the advance of said workpiece and the lifting of said grinding wheel for the production of a spiral point grind.

2. A machine for producing of spiral- and straight-fluted workpieces, particularly of twist drills by grinding, comprising
a revolving head swingable about its center axis,
a reciprocating workpiece slide retaining said revolving head,
a plurality of work spindles equal in number with that of working steps required for the production of the workpiece,
means for feeding all said work spindles simultaneously to the respective working positions, so that after a complete working cycle the workpiece can be removed in its finished state,
an advance cam disc having an additional pitch adapted to perform a slight advancing movement and to produce in cooperation with the rotary movement of said workpiece a cone envelope grind, and
a grinding wheel comprising a cup wheel disposed at a predetermined relief grind- and point grind-angle, in order to produce cone envelope grind on swist drills.

3. The machine, as set forth in claim 2, which includes means permitting swinging a head of said work spindles in said cone envelope face, thereby providing a vertical and horizontal adjusting possibility, in order to produce a cone envelope grind on twist drills.

4. The machine, as set forth in claim 3, which includes means causing engagement of said workpiece on said grinding wheel during its working advance stroke for the production of the spiral at the moment the edge of said work-piece is disposed vertically, and for lifting said grinding wheel from said workpiece upon completion of the grinding, in order to provide a face grind on flute workpieces.

5. The machine, as set forth in claim 3, which includes means for interrupting the advance and the rotary movement of said workpiece in a predetermined position upon termination of the flute- and relief-grind, and
a cam corresponding to the cone envelope shape and controlling said grinding wheel, in order to produce a cone envelope grind.

6. The machine, as set forth in claim 4, which includes means for interrupting the advance and the rotary movement of said workpiece in a predetermined position upon termination of the flute- and relief-grind,
means for feeding said grinding wheel to said workpiece along a straight line, in order to produce a face grind, and
means causing an additional swinging of the head of said spindles into a different angular position, in order to cause a two-face grind.

7. The machine, as set forth in claim 6, which includes
a cam disc, mounted on drive shaft,
a gear transmission adapted to drive said drive shaft,
a supplemental spiral operating in the direction of advance, so that not only a correction of the produced spiral can be obtained, but by selection of the pitch of the supplemental spiral also an omission of the rotary movement of said work spindles can be brought about.

8. The machine, as set forth in claim 7, which includes
a releasable coupling for each of said work spindles, whereby one of said work spindles is operated with a rotary movement and another of said work spindles is operated without a rotary movement.

References Cited

UNITED STATES PATENTS 3,309,819    3/1967    Guhring    51—219

FOREIGN PATENTS 694,082    7/1940    Germany.
515,532    2/1955    Italy.
473,026    8/1952    Italy.
517,928    3/1955    Italy.

JAMES L. JONES, Jr., Primary Examiner

U.S. Cl. X.R.

51—108, 134; 76—5